Jan. 9, 1940.　　　　　F. RAMPACHER　　　　　2,186,207

REGULATING TRANSFORMER

Filed Sept. 3, 1937

WITNESSES:

INVENTOR
Fritz Rampacher.
BY
ATTORNEY

Patented Jan. 9, 1940

2,186,207

UNITED STATES PATENT OFFICE 2,186,207

REGULATING TRANSFORMER

Fritz Rampacher, Berlin-Charlottenburg, Germany, assignor to Westinghouse Electric & Manufacturing Company, East Pittsburgh, Pa., a corporation of Pennsylvania Application September 3, 1937, Serial No. 162,298
In Germany March 30, 1937

7 Claims. (Cl. 171—119)

My invention relates to regulating transformers such as may be employed to vary the voltage supplied to a motor or other electrical apparatus.

An object of my invention is the provision of a regulating transformer having means for varying the secondary or output voltage without the necessity of employing switching devices on the low-voltage or output side of the transformer where high current carrying capacity is required.

Another object of my invention is the provision of a multiple-leg regulating transformer for supplying a variable voltage secondary load in which the voltage output from one portion is available to supply current to load devices requiring a constant voltage supply.

Other objects and advantages of my invention will appear from the following description of preferred embodiments thereof, reference being had to the accompanying drawing in which.

Figure 1:
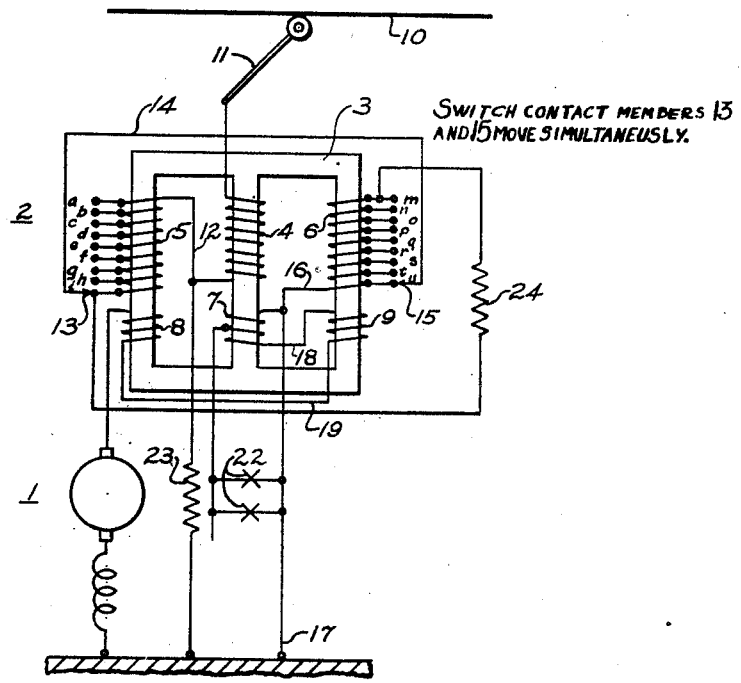
Figure 1 is a diagrammatic view of one embodiment of the invention.

Referring to Fig. 1, a regulating transformer 2 is illustrated for supplying energy to a motor 1, such, for example, as the motor of an electric locomotive, the transformer comprising a core structure 3 provided with three winding legs about which are wound primary windings 4, 5 and 6, and secondary windings 7, 8 and 9, respectively. The two primary windings 5 and 6 are regulated windings provided with tap changing switches for changing the effective number of turns. The primary windings are supplied with energy from an overhead conductor 10 through a circuit that extends from the conductor 10, through a trolley 11, winding 4, conductor 12, a portion of the winding 5 depending upon the position of a movable switch contact 13, conductor 14, a portion of the winding 6 depending upon the position of a movable switch contact 15, conductor 16 to ground at 17. This circuit connects the primary windings 4, 5 and 6 in series, the windings 5 and 6 being so arranged that their magnetizing effect is cumulative with that of the unregulated winding 4. The tap changing switches 13 and 15 are moved together, step by step, upwardly and downwardly to engage corresponding fixed contact members associated so that the sum of the number of turns in the winding 5 and in the winding 6 that are connected in series with the unregulated winding 4 is at all times approximately constant.

The secondary windings 7, 8 and 9 are also connected in series by a circuit extending from the grounded conductor 16 through the winding 7, conductor 18, winding 9, conductor 19, winding 8, through the motor 1 to ground. The circuit connections are so arranged that the magnetizing effect of the windings 7 and 9 are cumulative and are opposed by the magnetizing effect of the winding 8.

The outer primary windings 5 and 6 are provided with spaced tap connections leading to stationary switch contact members, those associated with the winding 5 being connected to members a, b, c, d, e, f, g, h and i, and those associated with the winding 6 being connected to members m, n, o, p, q, r, s, t and u, respectively. The tap changing mechanism actuates the movable switch contact members 13 and 15 upwardly or downwardly in synchronism so that the two movable contact members are always on corresponding taps of the two windings. In the illustrated position of the contact members 13 and 15, which are in engagement with the lower fixed contact members i and u, respectively, the primary series circuit includes the entire winding 5 and excludes the entire winding 6 corresponding to a minimum secondary output voltage applied to the motor 1. If the contact members 13 and 15 are in their extreme upper positions in engagement with the fixed contact members a and m, respectively, the series circuit will exclude substantially all of the winding 5 and include all of the winding 6 to effect a maximum voltage output applied to the motor 1. For intermediate positions of the contact members 13 and 15, corresponding portions of the windings 5 and 6 will be included in the primary winding circuit.

The transformer may be so designed that the number of turns in each of the three primary windings 4, 5 and 6 are alike, and the number of turns in each of the secondary transformer windings 7, 8 and 9 are alike, in which case half of the potential between the conductor 10 and ground is applied to the unregulated primary winding 4, the remaining half being applied across varying portions of the regulated windings 5 and 6 depending upon the positions of the tap changing switches 13 and 15.

In such a design, with the tap changing switches 13 and 15 in their lower or illustrated positions, the output voltage will be substantially zero, since the voltages across the primary windings 5 and 4 are equal, and the voltages across the corresponding secondary windings 8 and 7 are equal and opposite, and the voltage across the winding 9 associated on the same winding leg as the primary winding 6 is substantially zero. If the switch contact members 13 and 15 are raised to engage the fixed contact members e and q, respectively, half the number of turns of each primary winding 5 and 6 is included in the series connection and the voltage output from each of the windings 8 and 9 will be half the voltage output of the winding 7, but since they are connected in opposition, will cancel out and cause the secondary winding output voltage to correspond to the voltage of the secondary winding 7. If the contact members 13 and 15 are raised to their upper positions in engagement with the fixed contact members a and m, respectively, substantially the entire primary winding 5 is excluded from the primary series circuit, and the entire winding 6 is included so that the output voltage of the secondary winding 8 is reduced substantially to zero, and the output voltage of the secondary winding 9 is equal to the output voltage of the secondary winding 7 and in the same vector relation, so that when these two voltages are added, the secondary output voltage applied to the motor 1 is substantially twice the voltage across the secondary winding 7. For intermediate positions of the tap changing switch contact members 13 and 15, corresponding ratios in the output voltages of the windings 8 and 9 are developed and so added vectorially as to control the voltage applied to the motor 1 between the maximum and minimum above indicated. It will be noted that regardless of the positions of the tap changing switches 13 and 15, the voltage applied across the unregulated primary winding 4 is always a definite proportion (in the assumed design, one-half) the total voltage between the overhead conductor 10 and ground, and the output voltage from the secondary winding 7 is, therefore, a constant value regardless of the positions of the tap changing switches 13 and 15 and of the output voltage of the three series connected secondary windings. Consequently, the secondary winding 7 may be employed to supply energy to electrical apparatus requiring a constant potential supply source, such as the lamps indicated by the numeral 22.

A high resistance resistor 23 may be connected between the terminal of the primary winding 4 that is not connected to the trolley wire and ground, that is, between conductor 12 and ground, to prevent charging the low voltage end of the primary winding to a high potential upon failure of a tap changing switch to maintain the intended series connection. A high resistance resistor 24 may also be provided connected between the lower illustrated terminal of the primary winding 5 and the upper illustrated terminal of the primary winding 6 to effect the same purpose, or both resistors 23 and 24 may be provided.

Figure 2:
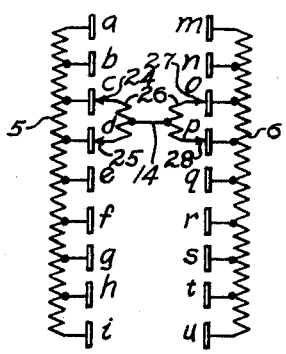
Figs. 2 and 3 illustrate modified arrangements of the tap changing switches and circuits.
Figure 3:
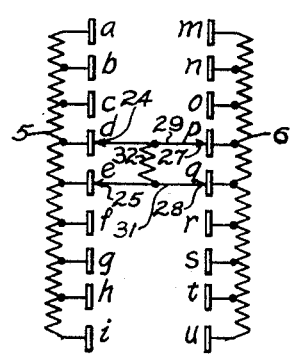

If it is desired to provide a larger number of tap changing steps, an arrangement such as that diagrammatically illustrated in Figs. 2 and 3 may be provided, wherein movable switch contact members 24 and 25 replace the contact member 13 of Fig. 1 and movable switch contact members 27 and 28 replace the movable contact member 15. In Fig. 2, a protective auto-transformer 26 is connected between the contact members 24 and 25, and a like protective auto-transformer is connected between the contact members 27 and 28, the mid-points of which are joined by the conductor 14. The sequence of steps of operation may be illustrated by the following table, it being understood that the several movable contact members are moved independently of one another:

| | | |
|---|---|---|
| 24, 25—a | 27, 28—m | 1st tap position |
| 24—a, 25—b | 27, 28—m | 1st transition |
| 24—a, 25—b | 27—m, 28—n | 2nd tap position |
| 24, 25—b | 27—m, 28—n | 2nd transition |
| 24, 25—b | 27, 28—n | 3rd tap position |

In the first position indicated in the table the movable contact members 24 and 25 are both in engagement with the contact member a and the movable contact members 27 and 28 are both in engagement with the fixed contact member m connecting the members a and m directly together. In the first transition position the contact member 25 moves into engagement with the fixed contact member b, the other movable contact members remaining unchanged. In the second tap position the contact member 28 has moved into engagement with the contact member n so that the contact members 24 and 25 bridge the contact members a and b and the contact members 27 and 28 bridge the contact members m and n, thus providing an intermediate tap step between a direct connection of the contact members a and m and a direct connection of the contact members b and n. In the second transitional step the contact member 24 has moved into engagement with the contact member b, the other movable contact members remaining in the positions as when in the second tap position. In the next or third tap position the contact member 27 has moved into engagement with the contact member n so that a direct connection is provided between the contact members b and n. Succeeding steps as the movable contact members move downwardly over the fixed contact members are performed in a manner similar to the steps described above in detail.

In the arrangement illustrated in Fig. 3, the movement of the contact members 24, 25, 27 and 28 is similar to that illustrated in Fig. 2, the contact member 24 being directly connected to the contact member 27 by conductor 29 and the contact member 25 being directly connected to the contact member 28 by conductor 31, thus eliminating the preventive autos 26 shown in Fig. 2 and the connection 14 between their mid-points, and substituting a choke coil 32 between conductors 29 and 31.

Many modifications in the apparatus and circuits described will appear to those skilled in the art within the spirit of my invention and I do not wish to be limited otherwise than by the scope of the appended claims.

I claim as my invention:

1. In a regulating transformer, in combination, a core having three winding legs, a primary winding and a secondary winding associated with each winding leg, said primary windings being connected in series, two of said windings being provided with tapped connections, tap changing switches associated therewith, and switch operating mechanism therefor operative for maintaining the sum of the coils of these two windings in series at all times substantially constant, the magnetizing effect of these two windings being cumulative with the winding on the third leg, said three secondary windings being also connected in series, those secondary windings on the same two legs with the tapped windings being differentially connected.

2. In a regulating transformer, in combination, a core having three winding legs, a primary winding on each winding leg, the several primary windings being connected in series and each having the same total number of turns, two of said windings being provided with tapped connections, tap changing switches associated therewith, and switch operating mechanism therefor for varying the number of turns in series and for maintaining the sum of the number of turns of these two windings at all times substantially constant, these two windings being so connected that the magnetizing effects are cumulative with the winding on the third leg, a secondary winding on each winding leg, each of the several secondary windings having the same number of turns, and those on the same two legs with the tapped primary windings being differentially connected.

3. In a regulating transformer, in combination, a core having a plurality of winding legs, a primary winding and a secondary winding on each of two winding legs, said primary windings being so connected in series that the magnetizing effects thereof are cumulative, said windings being provided with tapped connections and tap changing switches associated therewith; switch operating mechanism for maintaining the sum of the coils of these two windings in series at all times substantially constant, said secondary windings being differentially connected in series.

4. In a regulating transformer for supplying a variable voltage load, in combination, a core having three winding legs, a primary winding and a secondary winding associated with each winding leg, said primary windings being connected in series, two of said windings being provided with tapped connections, tap changing mechanism for maintaining the sum of the coils of these two windings in series at all times substantially constant, the magnetizing effect of these two windings being cumulative with the winding on the third leg, said three secondary windings being also connected in series with the variable voltage load, those windings on the same two legs with the tapped windings being differentially connected, one terminal of the unregulated primary winding being connected to a supply conductor, and a resistor connected between the other terminal and ground.

5. In a regulating transformer for supplying a variable voltage load, in combination, a core having three winding legs, a primary winding and a secondary winding associated with each winding leg, said primary windings being connected in series, two of said windings being provided with tapped connections and tap changing switches associated therewith, switch operating mechanism for maintaining the sum of the coils of these two windings in series at all times substantially constant, the magnetizing effect of these two windings being cumulative with the winding on the third leg, said three secondary windings being also connected in series with the variable voltage load, those windings on the same two legs with the tapped windings being differentially connected, one terminal of the unregulated primary winding being connected to a supply conductor and the other terminal of the three series connected primary windings being connected to ground, and a resistor of high resistance connected between the terminals of the regulated primary windings that are neither connected to the end of the ungrounded primary winding or to ground.

6. In a regulating transformer for supplying energy to a variable voltage load, in combination, a core having three winding legs, a primary winding and a secondary winding associated with each winding leg, said primary windings being connected in series, two of said windings being provided with tapped connections, tap changing mechanism for maintaining the sum of the coils of these two windings in series at all times substantially constant, the magnetizing effect of these two windings being cumulative with the winding on the third leg, said three secondary windings being also connected in series with the variable voltage load, those windings on the same two legs with the tapped windings being differentially connected, the unregulated primary winding being connected at one end of the series of primary windings and having one terminal connected to a supply conductor, a resistor of high resistance connected between the other terminal and ground, and a resistor of high resistance connected between the terminals of the regulated primary windings that are not connected to the end of the ungrounded primary winding or to ground.

7. In a transformer for supplying a variable voltage load and a constant voltage load, in combination, a core having three winding legs, a primary winding and a secondary winding associated with each winding leg, said primary windings being connected in series, two of said windings being provided with tapped connections, tap changing mechanism for maintaining the sum of the coils of these two windings in series at all times substantially constant, the magnetizing effect of these two windings being cumulative with the winding on the third leg, said three secondary windings being also connected in series with the variable voltage load, those windings on the same two legs with the tapped windings being differentially connected, and a constant voltage load supplied from the secondary winding on the leg with the unregulated winding.

FRITZ RAMPACHER.